United States Patent
Macri et al.

(10) Patent No.: US 7,934,109 B2
(45) Date of Patent: Apr. 26, 2011

(54) LOW POWER MODE UNIPOLAR CURRENT/VOLTAGE MODE INTERFACE

(75) Inventors: Joseph Macri, Sunnyvale, CA (US);
Steven Morein, Sunnyvale, CA (US);
Claude Gauthier, Sunnyvale, CA (US);
Ming-Ju E. Lee, Sunnyvale, CA (US);
Lin Chen, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 798 days.

(21) Appl. No.: 11/732,783

(22) Filed: Apr. 3, 2007

(65) Prior Publication Data

US 2007/0288781 A1 Dec. 13, 2007

Related U.S. Application Data

(60) Provisional application No. 60/788,836, filed on Apr. 3, 2006.

(51) Int. Cl.
*G06F 1/26* (2006.01)
*G06F 1/32* (2006.01)

(52) U.S. Cl. ......... 713/320; 713/300; 713/322; 713/323

(58) Field of Classification Search .................. 713/300, 713/320, 322, 323
See application file for complete search history.

(56) References Cited

U.S. PATENT DOCUMENTS

| | | | |
|---|---|---|---|
| 6,029,216 A | 2/2000 | Hoglund et al. | |
| 6,046,943 A * | 4/2000 | Walker | 365/189.05 |
| 6,079,022 A | 6/2000 | Young | |
| 6,185,692 B1 | 2/2001 | Wolford | |
| 6,370,630 B1 | 4/2002 | Mizuyabu et al. | |
| 6,438,159 B1 | 8/2002 | Uber et al. | |
| 6,477,205 B1 * | 11/2002 | Doblar et al. | 375/259 |
| 6,848,058 B1 | 1/2005 | Sinclair et al. | |
| 6,937,111 B2 * | 8/2005 | Kwon | 333/100 |
| 2003/0066005 A1 * | 4/2003 | Iglesia et al. | 714/752 |
| 2004/0205370 A1 | 10/2004 | McDevitt et al. | |
| 2005/0216607 A1 | 9/2005 | Munguia | |
| 2006/0082384 A1 * | 4/2006 | Deogun et al. | 326/31 |
| 2007/0038789 A1 * | 2/2007 | Macri et al. | 710/105 |
| 2007/0174643 A1 * | 7/2007 | Graef | 713/300 |

FOREIGN PATENT DOCUMENTS

WO WO 2005052820 A 6/2005

OTHER PUBLICATIONS

Form PCT/ISA/220, "PCT Notification of Transmittal of The International Search Report and the Written Opinion of the International Searching Authority, or the Declaration," 2 pgs.
Form PCT/ISA/210, "PCT International Search Report," 4 pgs.
Form PCT/ISA/237, "PCT Written Opinion of the International Searching Authority," 11 pgs.
Konrad Etschberger: "Controller-Area-Network" 2002, Carl Hanser Verlag Munchen, Munchen, XP002455831, pp. 59-63, pp. 110-118, pp. 131-134.
Philips Semiconductors: "The I2C-bus specification, version 2.1" 2000, Philips Semiconductors, XP002464622, pp. 5-12, p. 23, p. 32.

* cited by examiner

*Primary Examiner* — Vincent T Tran
(74) *Attorney, Agent, or Firm* — Barbara B. Courtney

(57) ABSTRACT

Embodiments of a power consumption reduction process for memory interfaces are described. A power management process reduces the amount of time that current flows in a high or low terminated, current or voltage mode unipolar bus interface by reducing the amount of time the bus remains in a logic state that requires current flow.

3 Claims, 8 Drawing Sheets

LOW POWER MODE UNIPOLAR CURRENT/VOLTAGE MODE INTERFACE

CROSS-REFERENCE TO RELATED APPLICATIONS

The present application claims the benefit of the U.S. Provisional Application, Ser. No. 60/788,836, entitled "Low Power Mode Unipolar Current/Voltage Mode Interface" and filed on Apr. 3, 2006.

TECHNICAL FIELD

The embodiments provided herein relate generally to computer systems, and more specifically to data transmission among electronic components.

BACKGROUND

Electrical busses require termination by resistors or impedance circuits to prevent signal reflections due to impedance mismatch between the bus line and any empty space beyond the end of the bus. Different bus topologies have different termination schemes. Some input/output (IO) busses may be terminated high (e.g., to supply voltage, $V_{DD}$), and others may be terminated low (e.g., to ground). The increased processing power and requirements of present computing and communications systems has led to the development of high bandwidth memory devices and interfaces. One such standard is double data rate memory (DDR), such as GDDR-4 which terminates to $V_{DD}$.

When current flows through a circuit, Direct Current (DC) power is consumed. It is generally desirable to reduce power consumption in many applications, and especially in mobile or miniaturized devices. In order to reduce the power consumption in bus-based circuits, it is desirable to maintain the bus in the particular logic state in which there is no current flow. The logic state in which there is no current flow depends upon the termination scheme of the bus. For example, a unipolar current-mode IO scheme consists of a switchable current source that, when active, pulls down on a termination resistor to generate the voltage sensed by the receiver. In a high termination system, DC power is consumed when the output is pulled down (logical 0), and no DC power is consumed (no current flows) when a logical one is transmitted. In a low termination system, the opposite is true; that is, no DC power is consumed for the logic 0 state, and DC power is consumed for logic 1 state.

In general, a bus must toggle to transmit data. FIG. 1 is a timing diagram illustrating the transmission of a data burst for an example bus circuit. Clock signal 102 represents a full-speed clock with a particular period, e.g., 1 ns. An example data burst 104 of eight bits 1 1 0 1 0 1 0 1 is transmitted in synchronization with the clock signal 102. Although one burst of eight bits is shown, it should be noted that any number of bits or data bursts can be transmitted in sequence. In an SDR (single data rate) system, as shown, each bit is transmitted on the rising edge of the clock signal. For clock periods in which no data is sent, the bus is in an idle state, as may be denoted by the presence of "D" symbols. For a DDR system, bits are transmitted on both the rising and falling edge of the clock signal. Although embodiments may be illustrated with respect to SDR systems, it should be noted that these embodiments also apply to DDR systems.

Present methods of reducing the DC power consumption during data transmission is data bus inversion, in which the sense of all of the bits on the bus is inverted if more than half will be pulled down. This technique can reduce the DC power nearly in half in certain applications. However, this approach typically requires the use of pins in a device (such as to indicate the inversion), and this in itself also consumes power.

Another technique of reducing DC power consumption, which is commonly used in current DRAM (dynamic random access memory) protocols, is to reduce the operating frequency of the bus. This approach is illustrated in FIG. 2, in which clock signal 202 switches at a lower frequency (longer period) than the full-speed clock signal 102, and the bits within data burst 204 are accordingly transmitted at a slower rate. For the example shown in FIG. 1B, clock signal 202 is approximately one-quarter the frequency of clock signal 102. This approach may reduce unnecessary switching in the control logic and thus save power, however, the energy per transition remains constant. This approach also requires the determination of the minimum frequency required to maintain the required bandwidth. Another disadvantage associated with this approach is that it does not ensure that the bus will remain in the logic state that minimizes current flow for a majority of the time.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Embodiments of a power consumption reduction process for memory interfaces are described. A power management process reduces the amount of time that current flows in a high or low terminated, current or voltage mode unipolar bus interface by reducing the amount of time the bus remains in a logic state that requires current flow.

In one embodiment, the power management process effectively skews the bus duty cycle in such a way that the time the bus spends at the undesirable logic state is minimized. A pulldown-style IO interface consumes DC power when it pulls an output low. For this type of interface, a low power state would keep the operating frequency high for the output, maintaining the same bit time as for high speed operation.

Figure 1:
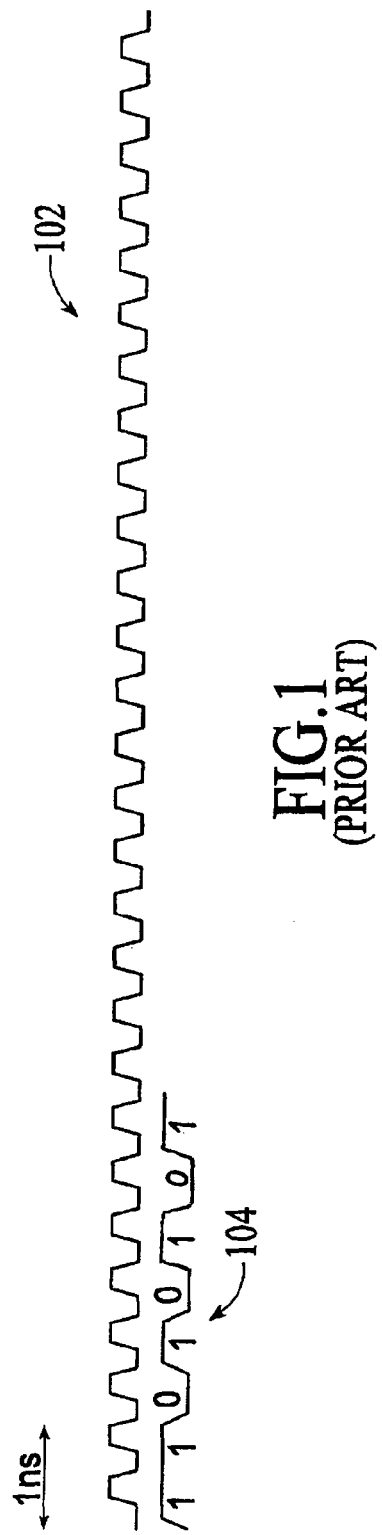
FIG. 1 is a timing diagram illustrating the transmission of a data burst for an example bus circuit.
Figure 2:
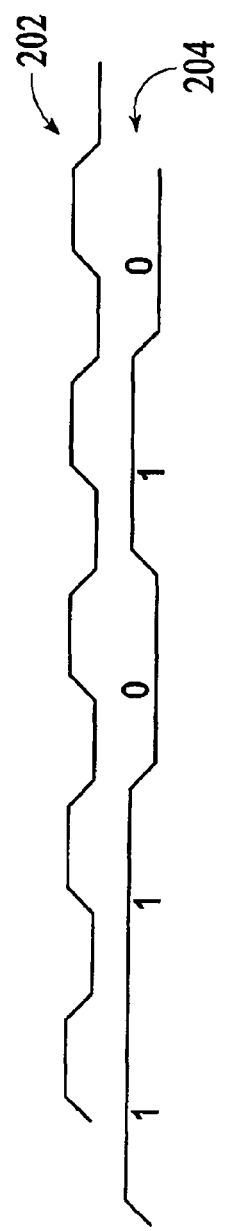
FIG. 2 is a timing diagram illustrating the transmission of data at a reduced frequency in certain prior art DRAM signaling protocols.
Figure 3:
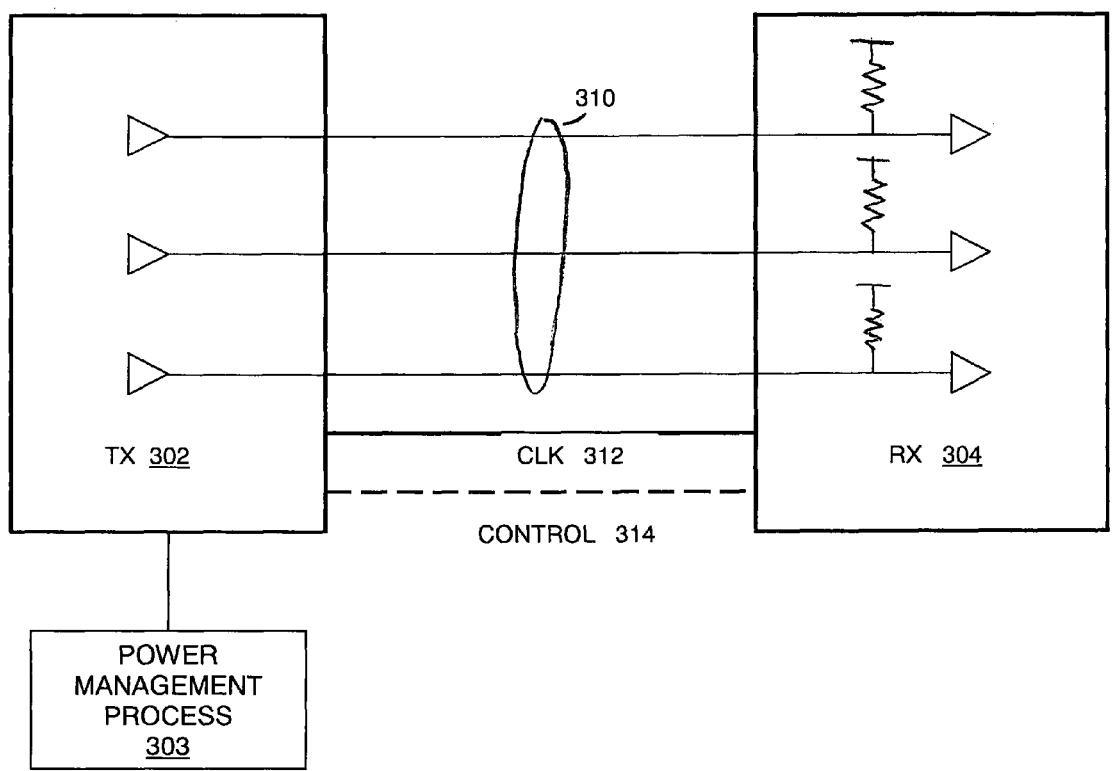
FIG. 3 illustrates a unipolar bus interface system that implements a power management process, under an embodiment.

FIG. 3 illustrates a unipolar bus interface system that implements a power management process, under an embodiment. In system 300, a transmitter 302 communicates with a receiver 304 over a bus 310. The communication of data is controlled and synchronized by a clock signal transmitted over clock line 312. Bus 310 comprises a number of individual transmission lines that are terminated by resistive circuits within the receiver 304. For the embodiment illustrated in FIG. 3, the transmission lines are terminated high, such as to $V_{DD}$. For the embodiment of FIG. 3, the transmitter 302 executes a power management process 303. The power management process represents a software process, hardware component, or other type of logic module or functionality that controls a characteristic of the clock signal 312, such as its duty cycle, in relation to the data transmitted over bus 310 in order to minimize the current flow, and hence the power consumption, during data transmission.

Embodiments of the power management process are described in relation to termination of the bus lines high, as shown in FIG. 3, however, alternative embodiments apply to interfaces in which the bus lines are terminated low, such as to ground. In these embodiments, the logic values for the power management process will be the opposite of those described in relation to the high terminated bus embodiment. The embodiments described apply to both current mode and voltage mode interfaces with similar topologies.

For the high terminated configuration of FIG. 3, when the bus transmits a logic 1, the signal on the bus goes to $V_{DD}$. In this case, the termination resistors see $V_{DD}$ on both sides, and therefore, the termination consumes no power. For system 300, the termination only consumes power when a logic zero is transmitted.

In one embodiment, the power management process is configured to effectively operate in low speed mode with regard to data transmission period, but maintain the duration of the bit time as in high-speed mode in relation to the full-speed clock. The power management process is configured to operate with either a high speed clock, if available, or a low-speed clock signal. The power management process 303 effectively transmits the data at a reduced clock rate, and uses a self timed pulse generator, or similar circuit if only a low-speed clock signal is available, to limit the data low time.

Figure 4:
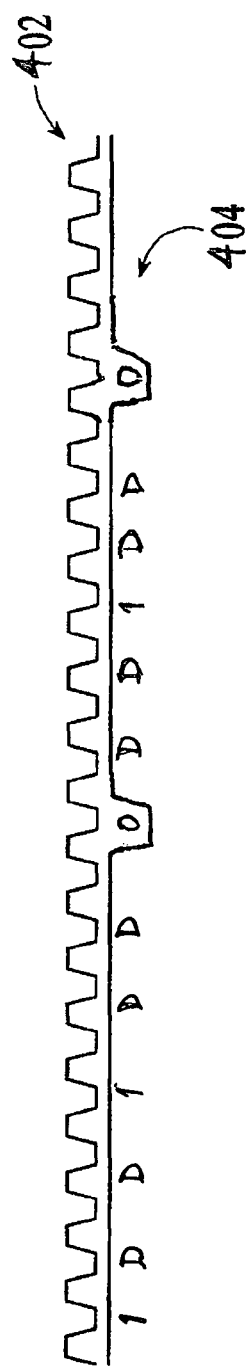
FIG. 4 is a timing diagram for an embodiment of a reduced frequency unipolar interface with a high speed clock.

FIG. 4 is a timing diagram that illustrates reduced frequency unipolar bus interface for a high speed clock, under an embodiment. As shown in FIG. 4, the example eight-bit data burst 1 1 0 1 0 1 0 1 is transmitted in sync with the full-speed clock signal 402. However, the data transmission frequency is reduced by a factor (e.g., factor "j") such as four or five, while the bit time is maintained relative to the clock period. For data bits that are within of the logic value that causes no current flow, the bus idle state is maintained until the opposite value is sent. The logic value that causes current flow is maintained only for the minimum period required, after which the bus is sent to the non-current flow idle state. Thus, as shown in FIG. 4, for a high terminated bus, the no-current logic state is "1" and the data burst comprising is kept in the logic 1 state for as long as possible. The diagram of FIG. 4 shows the first five bits 1 1 0 1 0 of the example eight-bit data burst, and the period of time in which a logic 0 is transmitted is minimized to a single clock period. If the effective clock frequency for data transmission is reduced by a factor of five, the bit time will still be $\frac{1}{100}^{th}$ period time. In this case, the logic 0 states are pulsed low for one full-speed clock cycle, and kept high otherwise. This is illustrated in FIG. 4 as the logic 1 values being followed by the appropriate number of high idle states "D" and the single clock pulsed "0" states.

For this embodiment, the power management process transmits a control signal over line 314 that maintains the bit time, as the frequency is reduced. This produces idle periods where the bus is floated high. For the high terminated case, the idle voltage corresponds to $V_{DD}$. During these idle periods according to different schemes, the bus floats, but if terminated to $V_{DD}$, the idle state and the logic 1 state are identical. The bit time also depends upon the configuration. For example, the four bit time per clock period corresponds to a quad data rate interface.

For an embodiment in which a high speed clock signal is present, such as that shown in FIG. 4, a control signal 314 can be transmitted by the power management process that forces the bus to the no current idle state after the current flow logic state is sent. In the high-speed clock circuit, every periodic designated edge (e.g., every fourth rising edge) signals the presence of a valid data bit, but there are several intervening designated edges in between these data capture edges.

Figure 6:
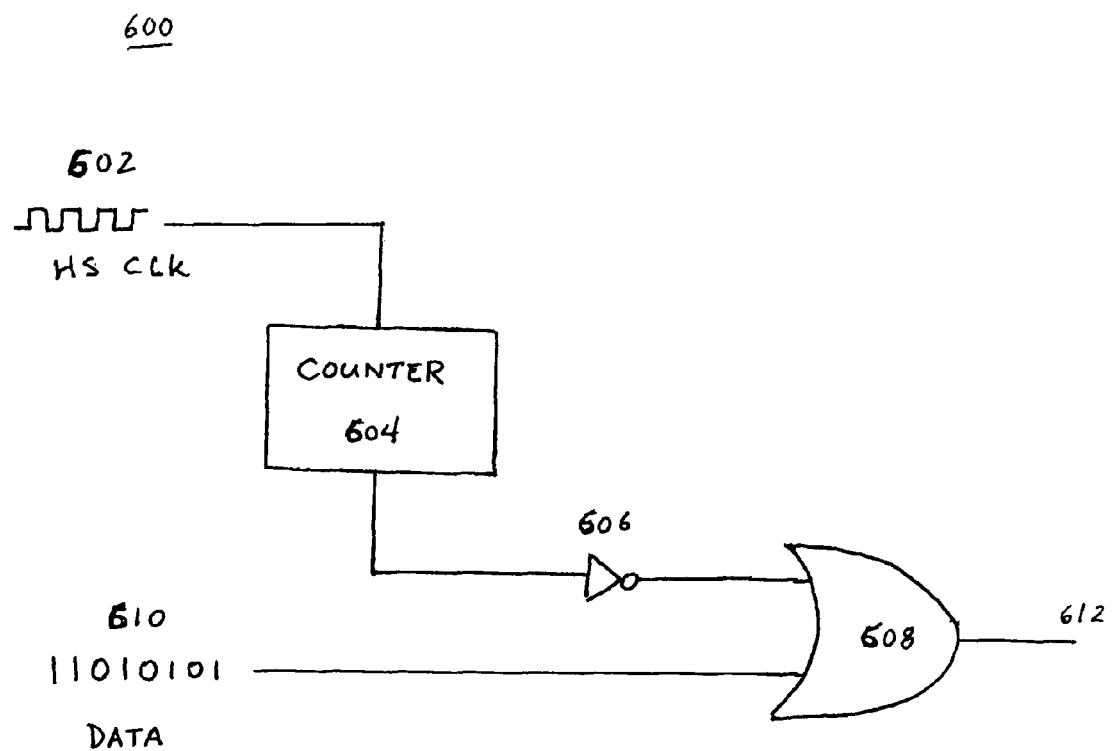
FIG. 6 illustrates a circuit implementing a power management process for a high speed clock, under an embodiment.

FIG. 6 illustrates a circuit implementing a power management process for a high speed clock, under an embodiment. In one embodiment, circuit 600 comprises a circuit that implements the power management process 303 of FIG. 3. The input to circuit 600 comprises a high speed clock signal 602. This clock is input to a counter or similar clock divider circuit 604. Counter 604 outputs a periodic signal that is true or high for one out of N clock pulses, where N is the count value. Typically, the counter ranges from a count value of two to eight. Thus, if N=2, the counter divides the clock frequency in half, if N=4, the counter divides the clock frequency by four, and so on. The output of the counter 604 is input to an inverter circuit 606, which is necessary for high terminated busses. The output of the inverter circuit 606 is combined with the data 610 in OR gate 608. The output 612 of the OR gate 608 comprises the data burst 610 in which the logic 0 values are gated low only for a single clock period, and the bus is held high at all other times, such as shown in the timing diagram of FIG. 4. FIG. 6 illustrates one possible circuit implementation of the power management process for a high speed clock, and various alternative embodiments or modifications are possible. For example, a flip-flop circuit may be provided between the data input 610 and the OR gate 608 to condition the clock signal relative to the data stream.

Figure 5:
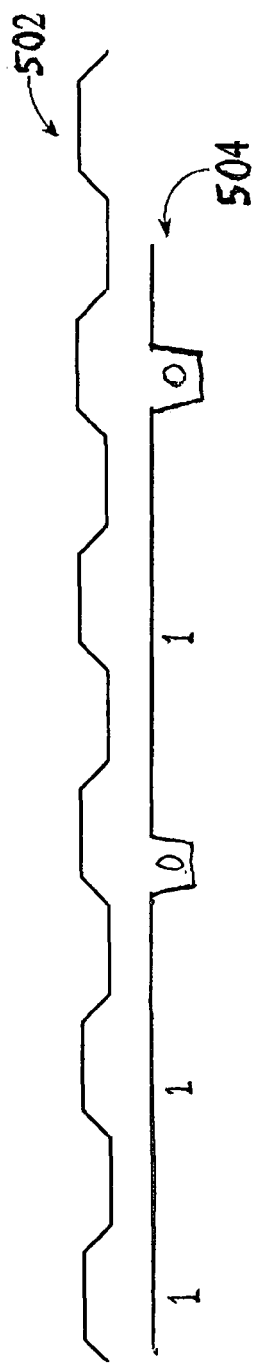
FIG. 5 is a timing diagram for an embodiment of a reduced frequency unipolar interface with a low speed clock.

In certain systems, a high speed clock signal may not be present, and only a low speed clock signal may be provided. In this case, the power management process includes a self-timing circuit, or similar mechanism, to drive the bus to the idle state after the appropriate minimum period of time after the current flow logic state is switched. In general, for a low-speed clock circuit, each designated edge (e.g., rising or falling edge) is used to capture a subsequent bit in a burst. Thus, for example, each rising edge signals the presence of a valid data bit. Single Data Rate (SDR) interfaces typically operate with low-speed clocks in which data is captured on each designated edge. FIG. 5 is a timing diagram that illustrates reduced frequency unipolar bus interface for a low speed clock, under an embodiment. As shown in FIG. 5, a low speed signal 502 is used to transmit the data between transmitter 302 and 304. The power management process 303 serves to gate the logic 0 signal only for a period of time representing a fraction of the low speed clock, and hold the signal high for the remainder of the time, as shown by example data burst 504.

Figure 7:
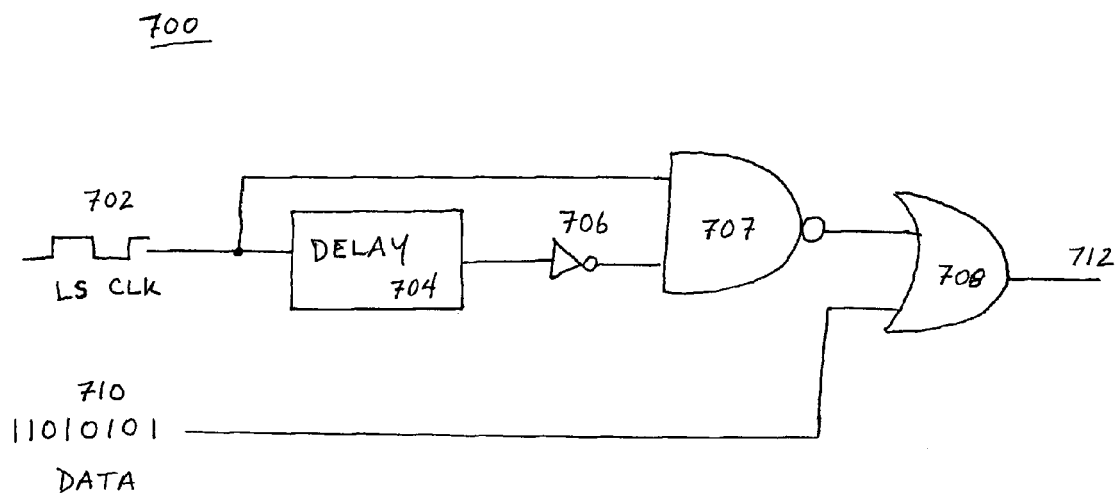
FIG. 7 illustrates a circuit implementing a power management process for a low speed clock, under an embodiment.

FIG. 7 illustrates a circuit implementing a power management process for a low speed clock, under an embodiment. Circuit 600 illustrates a self-timing pulse generator circuit that implements the power management process 303 of FIG. 3. The input to circuit 700 comprises a low speed clock signal 702. This clock is input to a delay circuit 704 that shifts the clock signal by a certain fraction of the clock period, such as one-eighth to one-half of the clock period. The output of the delay 704 is input to an inverter circuit 706. The original (unshifted) clock signal is combined with the inverted delayed clock signal in a NAND gate 707. The output of NAND gate 707 is combined with the data burst 710 in OR gate 708 to produce output 712 that comprises the data burst 710 in which the logic 0 values are gated low only for a single clock period, and the bus is held high at all other times, such as shown in the timing diagram of FIG. 5. FIG. 7 illustrates one possible circuit implementation of the power management process for a low speed clock, and various alternative embodiments or modifications are possible.

Figure 8:
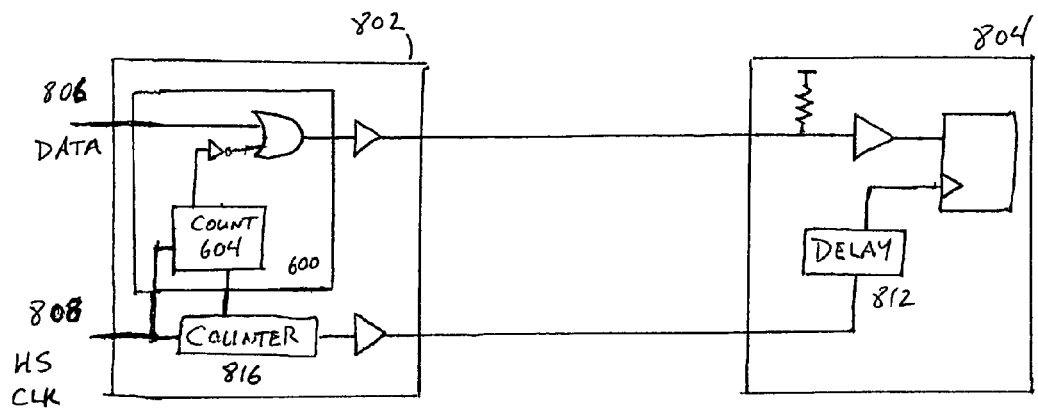
FIG. 8 illustrates the generation of control signals from a transmitter to a receiver for a high speed clock transmission, under an embodiment.

As shown in FIG. 3, the power management process 303 executed by the transmitter 302 controls the effective duty cycle of the clock signal 312 for the receiver 304 through control signals 314. In one embodiment, the transmitter forwards the clock signal to the receiver, along with the data. FIG. 8 illustrates the generation of control signals from a transmitter to a receiver for a high speed clock transmission, under an embodiment, and FIG. 9 illustrates the generation of control signals form a transmitter to a receiver for a low speed clock transmission, under an embodiment.

As shown in FIG. 8, the transmitter 802 receives the high speed clock signal 808. This clock signal is transmitted to receiver 804, and can be sent through a counter or clock divider 816 that reduces the frequency of the high speed clock in order to maintain integrity of the clock signal. The high speed clock signal 808 is also transmitted through the high speed clock power management circuit 600 (of FIG. 6). If a counter 816 is present, its output is used to synchronize the high speed clock that is input to circuit 600. The power generation circuit 600 combines the processed high speed clock signal with the data 806 in an OR gate, and the output data signal is transmitted to the receiver 804. In receiver 804, the high speed clock signal, after any frequency reduction by counter 816, is passed through an adjustable delay 812, which acts to center the receiving clock edge in the center of the timing window.

Figure 9:
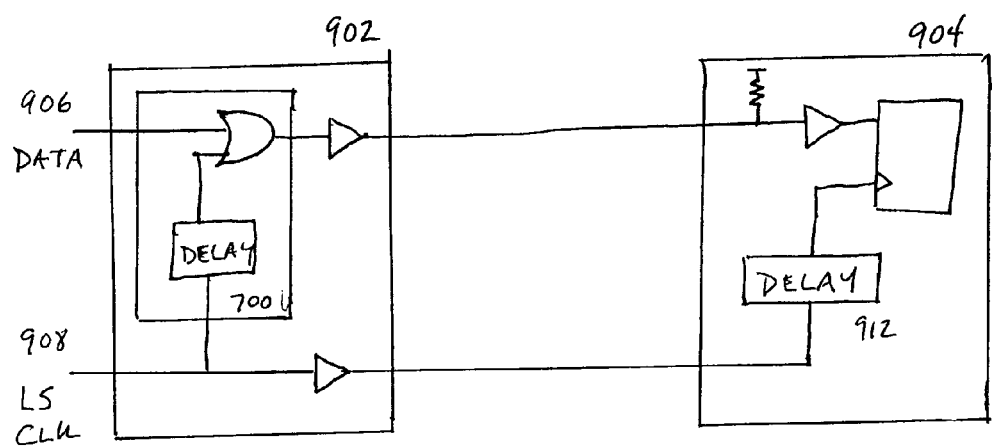
FIG. 9 illustrates the generation of control signals form a transmitter to a receiver for a low speed clock transmission, under an embodiment.

As shown in FIG. 9, the transmitter 902 receives the low speed clock signal 908 and passes directly to the receiver 904. In the transmitter 902, the low speed clock signal is also processed in the self-timing pulse generator circuit 700 (of FIG. 7). Circuit 700 combines a processed clock signal with the data 906 in an OR gate, and the output data signal is transmitted to the receiver 904. In receiver 904, the low speed clock signal is passed through an adjustable delay 912, which acts to center the receiving clock edge in the center of the timing window.

FIGS. 8 and 9 illustrate embodiments in which the transmitter forwards the clock signal to the receiver with the data. Alternatively, the receiver may generate its own clock signal, in which case the transmitter transmits only the data without the clock signal. For this embodiment, the receiver contains a phase-locked loop (PLL) circuit, or an equivalent to generate a clock signal to gate the input data. For this embodiment, data is transmitted from the transmitter to the receiver and the receiver includes a PLL circuit to phase align the data to a clock signal. Depending upon actual implementation, the receiver may include a single PLL circuit for all of the data lines, or one PLL per data line.

Figure 10:
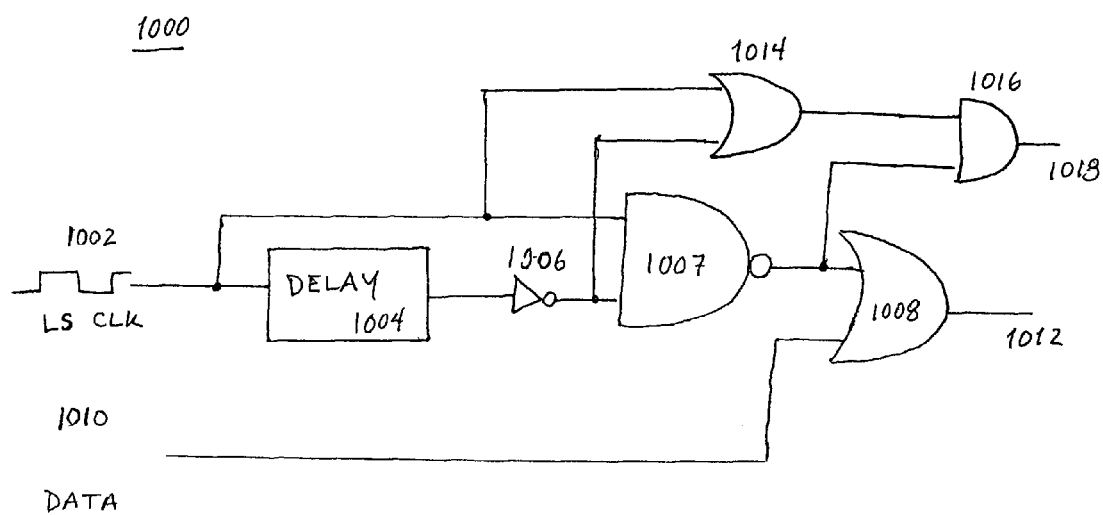
FIG. 10 illustrates a circuit implemented a power management process for a low speed clock in a DDR system, under an embodiment.

Embodiments have been illustrated with respect to SDR systems. However, embodiments may also be applied to DDR systems. In a DDR system, data is typically transmitted on both the rising and falling edges of the clock signal. For such a system, the power management process is configured to operate at an effectively reduced frequency with respect to data transmission, but in a manner that facilitates burst transmissions on both rising and falling clock edges. FIG. 10 illustrates the extension of the self-timed circuit for use in a DDR system under an embodiment. For this circuit 1000, a low speed clock signal 1002 is input into delay 1004. The output of delay 1004 is input through inverter 1006 to NAND gate 1007, which also receives as input the undelayed low-speed clock signal 1002. The low-speed clock signal and the inverted delayed clock signal are also combined in OR gate 1014. The output from OR gate 1014 and the output from NAND gate 1007 are then combined in the AND gate 1016 to produce the DDR-based data signal 1018. This signal comprises the data burst triggered on both the rising and falling edges of the clock signal. FIG. 10 illustrates an extension of the low speed clock power generation circuit for DDR systems. A similar extension can be made to the self-timed clock circuit of FIG. 6 in order to allow the high-speed clock embodiment to be used in DDR systems.

Figure 11:
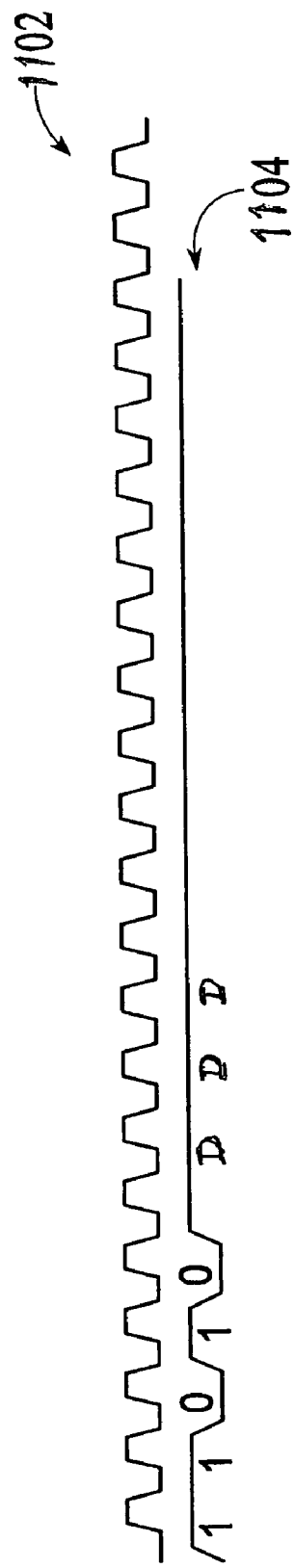
FIG. 11 is a timing diagram for an embodiment of a forced idle state of a unipolar interface with an example data burst pattern.

In an alternative embodiment, the transmission logic is gated so that the data burst is transmitted at full-speed (in sync with the full-speed clock), but the bus is held in the no current idle state for the remainder of the time. Thus, for example, at a one-quarter rate transmission, one command is transmitted per 16 of the high speed data unit periods, but all of the data bits appear sequentially at the beginning, and the rest of the time the bus is forced into the no current idle state. FIG. 11 is a timing diagram for an embodiment of a forced idle state of a unipolar interface with an example data burst. In FIG. 11, the full-speed clock 1102 synchronizes the transmission of the example 1 1 0 1 0 1 0 1 burst 1104. The burst is clocked on each designated edge of the full-speed clock, and the bus is forced to the logic high idle state until the next burst is transmitted.

In one embodiment, the circuit implementing the power management process can be any implemented in any type of bus-based interface, such as DDR interfaces, or any other memory or device interface. Furthermore, it may be implemented in any type of VLSI or ULSI chip, or any type of Application Specific Integrated Circuit (ASIC) that is used in or as part of a processor, co-processor, arithmetic logic units, or other processing units. Such a processing unit can be a Graphics Processing Unit (GPU), or Visual Processing Unit (VPU), which is a dedicated or integrated graphics rendering device for a personal computer, workstation, handheld device, digital television, game console or any other device that interfaces with memory and for which power conservation is a characteristic.

Aspects of the power management process described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects of the power management process may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

Persons of ordinary skill in the art will appreciate that the various functions described herein could be combined with other known power conservation techniques. For example, aspects of the invention could be combined with known techniques for reducing memory clock speeds. In such an embodiment, the full clock speed would be reduced by a factor (e.g., factor "n") while the effectively reduced clock speed would be reduced by both a factor of "n" and by another factor (e.g., factor "j", as described above).

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the power management process is not intended to be exhaustive or to limit the embodiments to the precise form or instructions disclosed. While specific embodiments of, and examples for, processes in graphic processing units or ASICs are described herein for illustrative purposes, various equivalent modifications are possible within the scope of the disclosed methods and structures, as those skilled in the relevant art will recognize.

The elements and acts of the various embodiments described above can be combined to provide further embodiments. These and other changes can be made to the power management system in light of the above detailed description.

In general, in the following claims, the terms used should not be construed to limit the disclosed method to the specific embodiments disclosed in the specification and the claims, but should be construed to include all operations or processes that operate under the claims. Accordingly, the disclosed structures and methods are not limited by the disclosure, but instead the scope of the recited method is to be determined entirely by the claims.

While certain aspects of the disclosed embodiments are presented below in certain claim forms, the inventors contemplate the various aspects of the methodology in any number of claim forms. For example, while only one aspect may be recited as embodied in machine-readable medium, other aspects may likewise be embodied in machine-readable medium. Accordingly, the inventors reserve the right to add additional claims after filing the application to pursue such additional claim forms for other aspects.

What is claimed is:

1. A method of reducing power consumption in a bus interface, comprising;
   holding the bus in an idle state in which no current is consumed by bus termination circuitry for a defined number of clock cycles following transmission of a first logic value that requires no current consumption by the first logic value;
   switching the bus for a minimum clock period required for transmission of a second logic value that requires current consumption by the bus termination circuitry; and
   returning the bus to the idle state upon transmission of the second logic value.

2. The method of claim 1, wherein the interface is a high terminated interface, and wherein the first logic value is a logic one, and the second logic value is a logic zero.

3. The method of claim 1, wherein the interface is a low terminated interface, and wherein the first logic value is a logic zero, and the second logic value is a logic one.

* * * * *